[12] United States Patent
Dalibard et al.

(10) Patent No.: US 10,369,697 B2
(45) Date of Patent: Aug. 6, 2019

(54) COLLISION DETECTION

(71) Applicant: SOFTBANK ROBOTICS EUROPE, Paris (FR)

(72) Inventors: Sébastien Dalibard, Paris (FR); David Gouaillier, St Jean de Boiseau (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 71 days.

(21) Appl. No.: 15/311,753

(22) PCT Filed: Jun. 5, 2015

(86) PCT No.: PCT/EP2015/062539
§ 371 (c)(1),
(2) Date: Nov. 16, 2016

(87) PCT Pub. No.: WO2015/185710
PCT Pub. Date: Dec. 10, 2015

(65) Prior Publication Data
US 2017/0173791 A1   Jun. 22, 2017

(30) Foreign Application Priority Data
Jun. 5, 2014   (EP) .................................. 14305848

(51) Int. Cl.
*B25J 9/16*   (2006.01)
(52) U.S. Cl.
CPC ........... *B25J 9/1674* (2013.01); *B25J 9/1653* (2013.01); *B25J 9/1697* (2013.01);
(Continued)

(58) Field of Classification Search
CPC ...... B25J 9/1674; B25J 9/1653; B25J 9/1676; B25J 9/1694; B25J 9/1697;
(Continued)

(56) References Cited

U.S. PATENT DOCUMENTS 5,214,362 A * 5/1993 Torii .................. G05B 19/4061
318/561
9,186,793 B1 * 11/2015 Meier .................... B25J 9/1694
(Continued)

FOREIGN PATENT DOCUMENTS

EP        1 477 284 A1    11/2004
WO     2014/068578 A1     5/2014

*Primary Examiner* — Spencer D Patton
(74) *Attorney, Agent, or Firm* — Baker & Hostetler LLP

(57) ABSTRACT

A computer-implemented method of determining a collision between an object and a robot, comprises monitoring one or more articular parts of the robot by measuring the parameters associated with the real displacements of the one or more articular parts; comparing the measured parameters with the expected parameters associated with the corresponding commanded displacements; and determining the probability of a collision with an object. Described developments comprise the exclusion of system failures, the identification of the collided object by computer vision or by communicating with the object, the execution of one or more actions such as a safety mode, the identification of systematic discrepancies in performed comparisons, the grouping of articular parts belonging to a same articular chain, and the mutual surveillance of robots. The use of capacitive sensors, bumper sensors and magnetic rotary encoders is disclosed.

6 Claims, 4 Drawing Sheets

(52) U.S. Cl.
CPC .............. *G05B 2219/37622* (2013.01); *G05B 2219/37624* (2013.01); *G05B 2219/39011* (2013.01)

(58) Field of Classification Search
CPC ........... G05B 2219/37624; G05B 2219/37622; G05B 2219/37627; G05B 2219/37629; G05B 2219/37618; G05B 2219/37619; G05B 2219/37623; G05B 2219/37625; G05B 2219/39011
See application file for complete search history.

(56) References Cited

U.S. PATENT DOCUMENTS

| | | | |
|---|---|---|---|
| 2005/0222554 A1* | 10/2005 | Wallace ................. | A61B 5/042 606/1 |
| 2006/0033462 A1* | 2/2006 | Moridaira .............. | B25J 9/1674 318/568.12 |
| 2009/0171373 A1* | 7/2009 | Farritor ................. | A61B 90/37 606/130 |
| 2014/0067660 A1* | 3/2014 | Cornish ............... | G06Q 20/145 705/39 |
| 2015/0112480 A1* | 4/2015 | Nakata ..................... | B25J 19/06 700/245 |
| 2015/0147148 A1* | 5/2015 | Coady ............... | H01L 21/68707 414/744.2 |

\* cited by examiner

COLLISION DETECTION

CROSS-REFERENCE TO RELATED APPLICATIONS

This application is a National Stage of International patent application PCT/EP2015/062539, filed on Jun. 5, 2015, which claims priority to foreign European patent application No. EP 14305848.5, filed on Jun. 5, 2014, the disclosures of which are incorporated by reference in their entirety.

TECHNICAL FIELD

This patent relates to the field of digital data processing and more particularly to systems and methods of detecting a collision between an object and a robot.

BACKGROUND

Robots are increasingly present, not only in factories but also at homes (e.g. as companion humanoid robots).

Robots interact with their environment and can collide with static or moving objects (e.g. toys) or obstacles (e.g. animals).

Most solutions of the prior art disclose methods and systems for collision avoidance.

For safety considerations, and more generally for rich man-machine interactions, there is a need for systems and methods of detecting and appropriately handling a collision between an object (or an obstacle) and a robot.

SUMMARY

There is disclosed a method of determining a collision between an object and a robot, comprising: monitoring one or more articular parts of said robot by measuring the parameters associated with the real displacements of said one or more articular parts; comparing said measured parameters with the expected parameters associated with the corresponding commanded displacements; and determining the probability of a collision with an object.

Parts of the robot comprise head, legs, feets, arms, hands, torso or other parts (sensors, motors, circuits such as CPU and communication board). Motions of the robot can be characterized by the geometric positions and motion speeds of its different parts.

In an embodiment, comparisons are performed between the real measured motions of the robot and the expected motions associated with the transmitted command (a command is translated into a tension or current to be applied to a certain motor generally located at articular locations).

For example, the sensor of one articulation can show a discrepancy between the reality (as measured) and the computation (as modeled or as expected or as instructed or as commanded). In a typical situation, a handshake given by a human to the robot can be detected when while a constant command has been sent, particular motions of the arm are detected.

In order to maintain an efficient behavior, measures and comparisons are generally performed continuously. In some other embodiments, measures are performed intermittently or even periodically (e.g. with interpolation).

Regarding the measurements, the robot can embed sensors on the head, legs, feets, arms, hands, torso or other parts. Parts of these sensors can be capacitive (i.e. can detect human skin touch). These sensors are in limited number. Therefore a global approach, envisioning the robot as a whole system can help to integrate and understand to global situation.

In a development, the step of determining the probability of a collision with an object comprises a step of excluding one or more failures associated with the one or more parts of the robot.

After an optional step consisting in filtering possible systems failures (e.g. the motor in one arm can be blocked in a situation), possibly by independent or at least other means, there can be deduced which part of the robot has encountered an obstacle.

In a development, the method further comprises a step of identifying the collided object by computer vision or by communicating with said object.

There can be further identified or assessed or determined the type of the collided object (kid, furniture, animal, toy, etc). The main methods to perform such identification comprise image recognition and/or communication if in presence of a connected or connectable device (Internet of things, by Wifi, BLE, Wifi, etc)

In a development, the method further comprises a step of executing one or more actions.

Based on the determination of the probability of collision, certain predefined tasks or motions or actions can be executed. In a particular embodiment, for example once the object type is identified (image recognition or an RFID tag in the collided object can provide identification to the robot), further actions can be performed.

In a development, an action is associated to a safety mode.

After the collision with an obstacle has been detected, diverse actions can follow. These actions are generally defined by the software application developers. In some situations, a "programmed" curiosity can lead the robot to try to renew contact. In some other situations, other programs or activities may lead the robot to try to avoid renewed contact. Intermediate actions can be performed (renew contact but at low speed, etc).

In most cases, the robot slows down for safety reasons. In particular, when moved by an external force, the robot can relax its control (e.g. it will not rigidify its articulations, it will generally slow down to avoid further collisions, primarily to avoid hurting someone and in order to avoid to damage itself). Slowing down advantageously enables to minimize further shocks, if any.

In other words, for the sake of safety, in an embodiment, the robot can adopt a default strategy consisting in slowing down its movements (e.g. reducing speed and/or amplitude or movements), if not stopping completely its movements. Certain combinations of events can lead the robot to "understand" that a user is willing to play or otherwise interact with it, and in this case, the robot may take other actions.

In a development, the measured parameters comprise geometric position parameters and/or speed of displacement parameters.

In a development, the method further comprises a step of identifying systematic discrepancies in performed comparisons.

In some embodiments, long term learning can be derived from the detection of systematic bias, for example as statistically measured on the installed base, over time. The combinatorics of the geometric positions of the robot are computed and known (the geometry and the degrees of freedom are known, i.e. with sufficient precision). The combinatorics of the dynamics of the robot is not fully known, for example with respect to complex and fast movements of the robot. For example, some rapid animations may not be executed exactly as planned. Real measures may lead to detect that a special movement (e.g. dance, karate) may prove to lead to signs of wear or to imply a dangerous equilibrium. In turn, tolerances of the considered movement may be inhibited (for example through a patch distributed against the installed base). A failure in the execution of a command can also be diagnosed if occurring repeatedly.

In a development, an articular part of the robot is associated with the head or a leg or a foot or an arm or a hand or the torso.

In a development, the step of determining the probability of a collision with an object comprises the step of integrating the comparisons performed for articular parts of the robots belonging to a same articular chain, said articular chain grouping related articular parts.

An articular chain is composed of articular parts. For example, considering a robot with two arms and some capacitive sensors on each hand, there can be defined a group "right arm" containing all the articular parts (or joints) of the right arm and all capacitive sensors of the right hand.

In a further step, articulations, tactile sensors and bumpers are grouped together to output a reliable information, providing a global understanding of the motion of the robot. There is disclosed a step of fusing measurements from capacitive sensors, bumpers and MREs. Capacitive sensors, bumpers and MRE based touch detection can be subject to fast oscillations (touched/untouched). This is undesired for applications using touch information. To minimize oscillations, in an embodiment, the method groups joints and sensors by articular chains.

In a development, the grouping step is dynamic.

While in some embodiments, articular chains can be predefined (i.e. each chain comprises a plurality of articular parts in a stable manner), in some other embodiments, articular chains can be dynamically defined (e.g. torso and right arm will be considered at a certain time as corresponding to a same and unique mass, at other times the perimeter will be different). This embodiment can simplify computations.

In a development, the measuring and the comparing steps are independently performed by the robot.

In an embodiment, both steps (processes measure/comparison) are performed by the (same) robot. For example, software implementation can get a "watchdog" or "daemon" to continuously run in background to perform these operations. Processes can remain "independent", up to some point (the same robot hosts the two processes). Sensor and actuator are physically independent but may be logically associated or correlated.

In an embodiment, circuits can be redundant. In another embodiment, even energy sources associated to such redundant circuits can be redundant.

In an embodiment, the measuring step is performed by the robot and the comparison step is performed by an independent entity.

In an embodiment, the independent entity can be a second robot for example. In an embodiment, the independent entity can be composed by a plurality of other robots (robots can observe and monitor themselves). In one embodiment, an independent camera in the vicinity of the robot (for example worn by the user e.g. smart glasses or a webcam in the apartment etc) can provide such an independent assessment of the movements or displacements of the robot.

There is disclosed a computer program comprising instructions for carrying out one or more steps of the method when said computer program is executed on a suitable computer device.

There is disclosed a system comprising means adapted to carry out one or more steps of the method. The robot can maintain a mental map of the vicinity (for example with computer vision, as a GPS may not work underground or inside an apartment or house)

In a development, a real displacement of a part of the robot is measured by a magnetic rotary encoder. For example, there can be measured errors between articular commands and sensors' measures (e.g. articular positions measured with one or more of such magnetic rotary encoders).

In a further development, the measured displacement of a part of the robot is confirmed by a capacitive sensor or a bumper sensor (these sensors can detect a contact with an obstacle or an animal or an object, in particular can detect skin touch). Regarding collision of the robot with an object or an obstacle, there are several possibilities indeed. There can be a contact first, without a further displacement (i.e. the robot is only touched). There can be a contact and then a displacement (i.e. the robot is touched and collided and/or colliding, and the contact location is detected). There also can be a displacement, without a prior detected contact (i.e. there are no sensors at the location of the contact). The information about a contact can be used as a confirmation of a further measured displacement (but said contact information is not required as such). The information about the exact location of the contact, if available, can be taken into account in order to compute the characterization of the collision.

BRIEF DESCRIPTION OF DRAWINGS

Embodiments of the present invention will now be described by way of example with reference to the accompanying drawings in which like references denote similar elements, and in which.

DETAILED DESCRIPTION

A robot generally monitors its environment and its own internal state. A robot can collide with one or more obstacles. An obstacle for example can be a piece of furniture (e.g. chair or table), a human (e.g. a kid), an animal (e.g. a cat), an object (e.g. a toy, a balloon). Obstacles can be static or moving. The robot can be static of moving.

Avoidance of expected collisions (e.g. with objects or obstacles) can be performed thanks to various system means and methods (e.g. maintaining safety areas around the robot), but some methods can be limited and miss certain collisions (out of sight, out of reach, lack of sensors, light touch, etc) and/or fail to correctly characterize the collision (e.g. softness, hardness, flexibility, own movement, etc)

Unexpected collisions (with one or more objects or obstacles) can be characterized and further handled as well, according to the disclosed embodiments of the present invention.

According to an embodiment of the invention, a robot (for example a companion robot placed in an apartment) continuously assesses (e.g. measures) its environment, for example at a short distance (e.g. in its immediate vicinity) by means of computer vision means or telemetry or lasers. Information associated with obstacles (potential obstacles or unexpectedly encountered) can be continuously monitored (e.g. gathered, centralized) and compared with data received from sensors. In addition, comparisons between expected and performed motions can be performed and can lead to further characterize detected collisions.

In an embodiment, the robot embeds sensors which continuously apprehend the environment. In particular, the robot in some embodiments can embed capacitive sensors (e.g. sensitive to touch), "bumper" sensors, or sensors of other types (motion detection, IR, pneumatic sensors, microphone, cameras, etc).

These sensors are necessarily in limited number (cost, manufacturing, design, etc), so it can happen that an obstacle (or the reception of a user solicitation) can fail to be detected (for example if the robot is touched at a location lacking a suitable sensor, e.g. in-between two tactile sensors). Indirect detection is possible, though. By comparing the expected movement with the real measured performed movement, it can generally be assessed whether an obstacle as been encountered (or not) and/or whether a failure in movement execution has happened.

Figure 1:
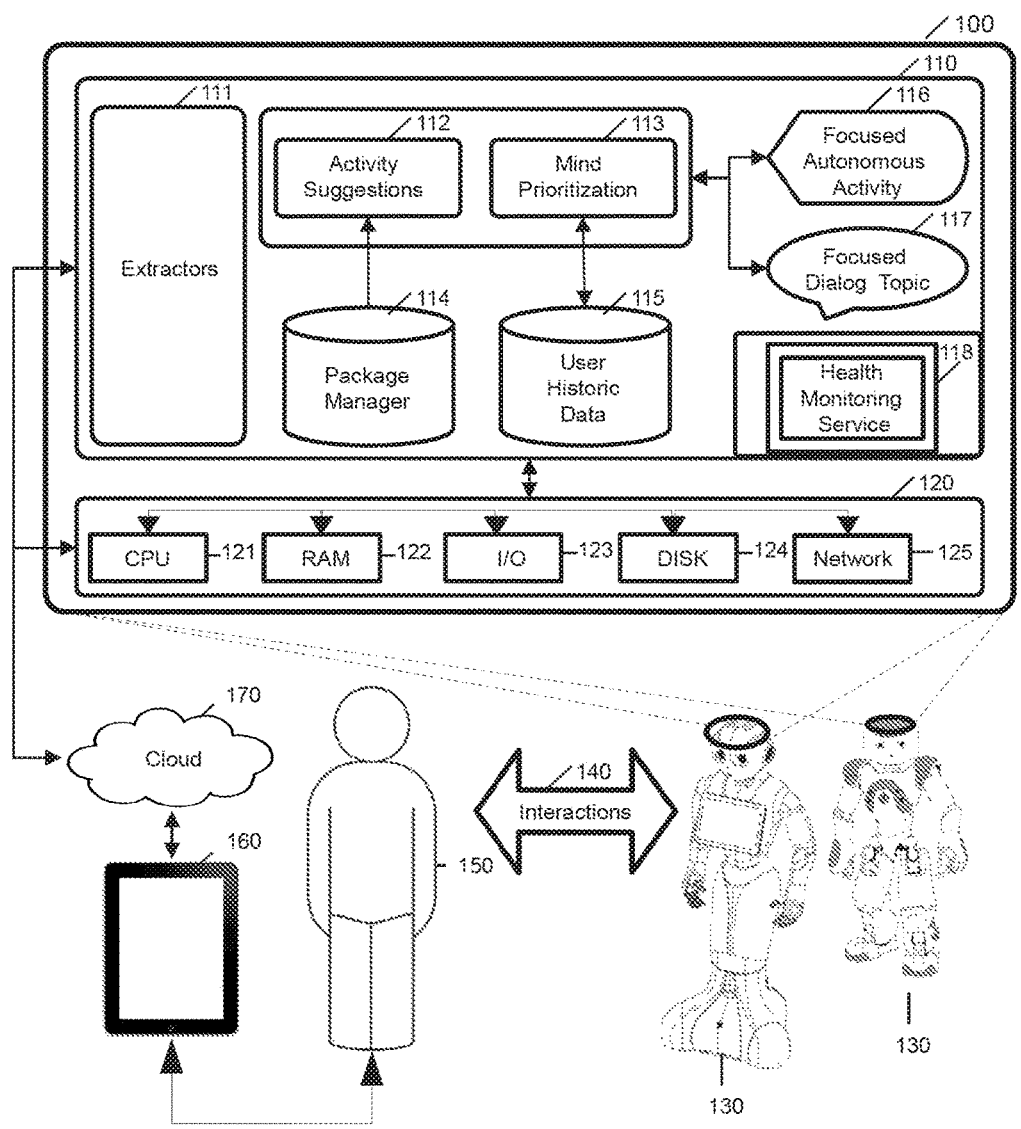
FIG. 1 illustrates the global technical environment of the invention.

FIG. 1 illustrates the global and technical environment of the invention. A robot 130 comprises sensors and actuators. A logic or "mind" 100 is implemented in the robot or associated with it (for example remotely) and comprises a collection of software 110 and hardware components 120. The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking. Robots can be reminiscent of human or animal form.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

The collection of software 110 (non-exhaustively) comprises software modules or objects or software code parts, in interaction with one another, including "extractors" 111, "activity suggestions" 112, "mind prioritization" 113, "package manager" 114, "User historical data" 115, "Focused Autonomous activity" 116 and "Focused Dialog Topic" 117 and a "Health Monitoring Service" 118.

An "Extractor Service" 111 generally senses or perceives something internal or external of the robot and provides short term data into the robot's memory. An Extractor service receives input readings from the robot sensors; these sensor readings are preprocessed so as to extract relevant data in relation to the position of the robot, identification of objects/human beings in its environment, distance of said objects/human beings, words pronounced by human beings or emotions thereof. Extractor services in particular comprise: face recognition, people perception, engagement zones, waving detection, smile detection, gaze detection, emotion detection, voice analysis, speech recognition, sound localization, movement detection, panoramic compass, robot pose, robot health diagnosis, battery, QR code handling, home automation, tribes, time and schedule.

An "Actuator Service" makes the robot 130 physically do or perform actions. Motion tracker, LEDs, Behavior manager are examples of "Actuator Services".

A "Data Service" provides long-term stored data. Examples of Data Services are a User Session Service 115, which stores user data, and their history of what they have done with the robot and a Package Manager Service 114, which provides a scalable storage of procedures executed by the robot, with their high level definition, launch conditions and tags. "Package Manager" in particular provides the scalable storage of Activities and Dialogs, and the Manifest. The "Manifest" contains metadata such as launch conditions, tags, and high level descriptions.

A "Mind Service" (for example a service Mind Prioritization 113) is one that will be controlled by the robot's central "Mind" when it is initiating action. "Mind Services" tie together "Actuator services" 130, "Extractor services" 111 and "Data services" 115. Basic Awareness is a "Mind Service". It subscribes to "Extractor Services" such as People perception, Movement detection, and Sound localization to tell the Motion Service to move. The "Mind" 113 configures Basic Awareness's behavior based on the situation. At other times, Basic Awareness is either acting own its own, or is being configured by a Running Activity.

"Autonomous Life" is a Mind Service. It executes behavior activities. Based on the context of a situation, the Mind can tell autonomous life what activity to focus ("Focused Autonomous Activity" 116). Metadata in manifests tie this information into the mind. Any activity can have access to one or more of the Operating System APIs. Activities can also directly tell Autonomous Life what activity to focus, or tell the Dialog Service what topic to focus on.

The "Dialog" service can be configured as a Mind Service. It subscribes to the speech recognition extractor and can use "Animated Speech Actuator Service" to speak. Based on the context of a situation, the Mind can tell the Dialog what topics to focus on (a "Dialog Topic"). The "Dialog" service also has its algorithms for managing a conversation and is usually acting on its own. One component of the Dialog service can be a "Focused Dialog Topic" service 117. Dialog Topics can programmatically tell the Mind to switch focus to (or execute or launch) a different Activity or Dialog Topic, at any time. One example of possible method to determine the Dialog Topic can comprise: at the moment that a dialog topic or activity's launch conditions become true or false, a list of all possible Activities or Dialog Topics for the moment is sent to the Mind; the list is filtered according to activity prioritization; the list order is randomized; the list is sorted (or scored) to give precedence to Activities or Dialog Topics that are "unique" and have been started less often; a special check to make sure the top Dialog Topic or Activity in this list isn't the same activity as the previous activity that was executed. The list can be again sorted and filtered according to the preferences of the user.

The robot can implement a "health monitoring" service 118. Such a service can act as a daemon or a "watchdog", to review or control or regulate the different priorities of the robot. Such a service can monitor (continuously, intermittently or periodically) the status of the internal components of the robot and measure or anticipate or predict or correct hardware failures. In a development, the fleet (e.g. installed base) of robots is monitored. The embedded service can continuously detect faulty situations and synchronize them with a "cloud" service (once every minute for example).

Hardware components 120 comprise processing means 121, memory means 122, Input/Output I/O means 123, mass storage means 124 and network access means 125, said means interacting with one another (caching, swapping, distributed computing, load balancing, etc). The processing means 121 can be a CPU (multicore or manycore) or a FPGA. The memory means 122 comprise one or more of a flash memory or a random access memory. The I/O means 123 can comprise one or more of a screen (e.g. touch screen), a light or LED, a haptic feedback, a virtual keyboard, a mouse, a trackball, a joystick or a projector (including a laser projector). The storage means 124 can comprise one or more of a hard drive or a SSD. The network access means can provide access to one or more networks such as a 3G, 4G/LTE, Wifi, BLE or a mesh network. Network traffic can be encrypted (e.g. tunnel, SSL, etc).

In an embodiment, computing resources (calculations, memory, I/O means, storage and connectivity) can be remotely accessed, for example as a complement to local resources (available in the robot itself). For example, further CPU units can be accessed through the Cloud for voice recognition computing tasks. Computing resources also can be shared. In particular, a plurality of robots can share resources. Connected devices in the vicinity of the robot also can share resources to some extent, for example via secured protocols. Display means also can be shared. For example, the television can be used as a further display by the robot when passing by.

Figure 2:
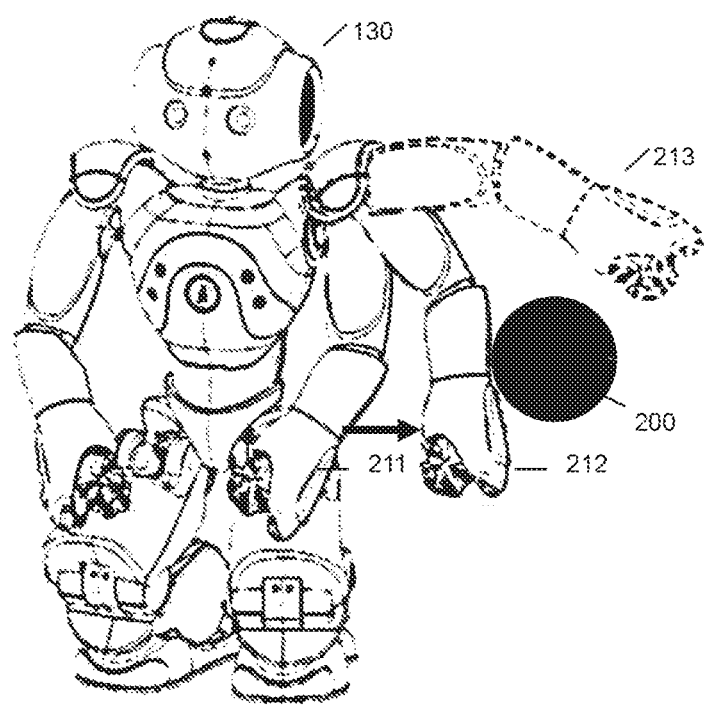
FIG. 2 illustrates an example of a collision between the robot and an obstacle.

FIG. 2 illustrates an example of a collision between the robot and an obstacle. The robot 130 is planning a trajectory or a gesture or a movement or a sequence of motions of the arm, e.g. supposedly starting at position 211 and terminating at position 213. At a certain moment, an unexpected collision with an obstacle 200 (or an object) blocks the arm in a position 212. By comparing the real or obtained position with the expected or calculated position of the arm according to the expected trajectory, the robot can deduce that a collision has occurred, and, in some embodiments, where, when and how the collision occurred.

Figure 3A:
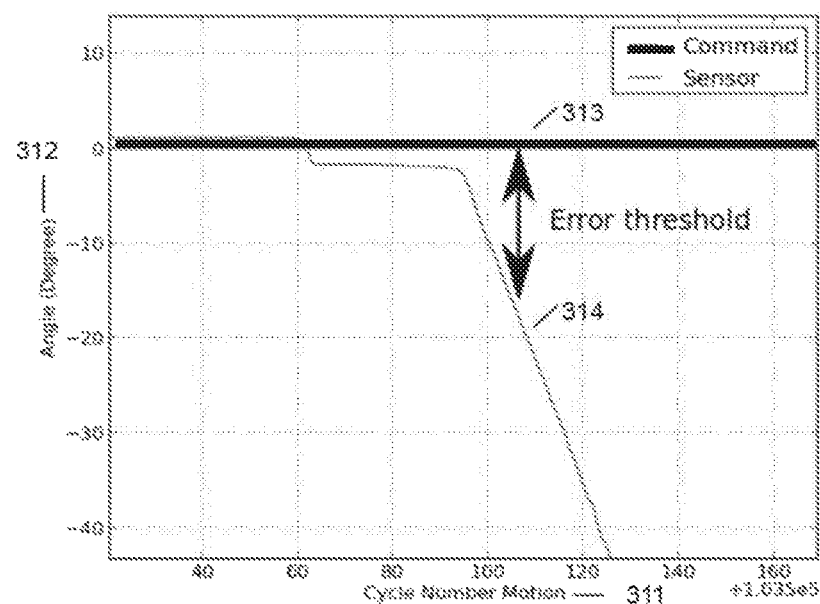
FIGS. 3A, 3B and 3C show examples of comparisons between commanded and measured motions.
Figure 3B:
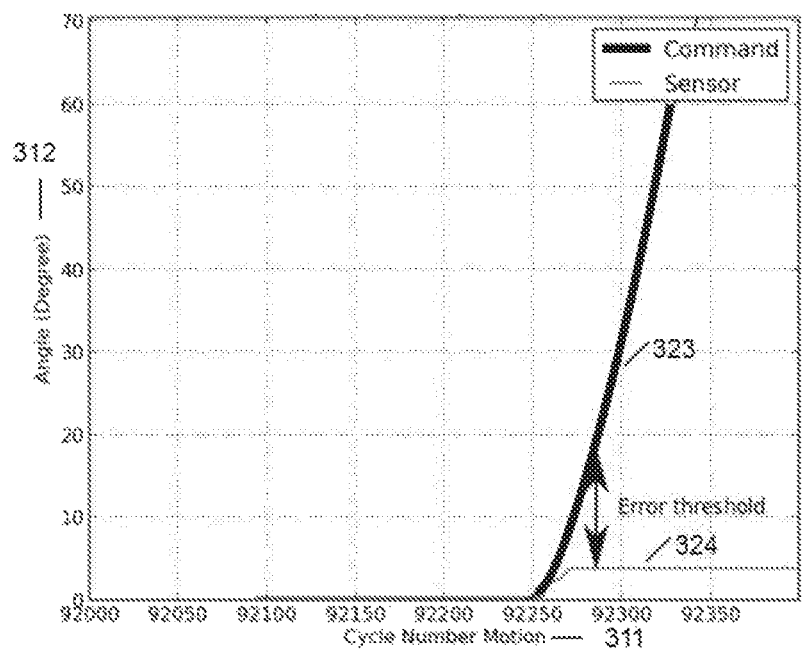
Figures 3C, 4:
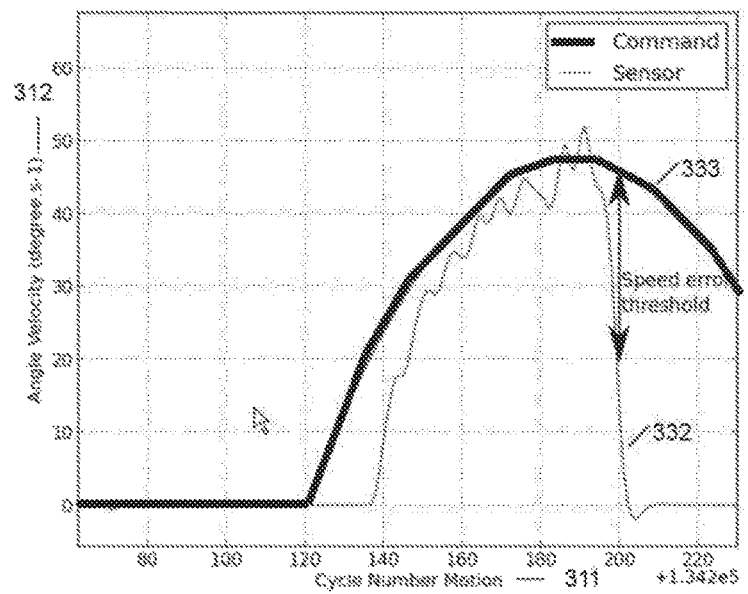
FIG. 4 details some aspects of the method.

FIGS. 3A, 3B and 3C show some examples of discrepancies between sent commands and the corresponding observed movements. Possible interpretations are provided (for example an object forcing the robot to move, the robot being blocked at some point by an obstacle, an unexpected obstacle slowing down the motion of the robot).

In FIG. 3A, the command is stable, the sensor indicates the presence of movement: something is forcing on a body attached to the joint. A constant command 313 is sent at a certain articular motor which is monitored (for example). An angle 312 associated to this monitored body part equals zero during the different cycle number 311, indicative of time. Suddenly, then increasingly, an angular deviation (or gap or discrepancy or spread or difference or variation) is measured. It is possible to deduce that a collision has occurred, since a predefined measurement error threshold is exceeded (i.e. a collision is considered as certain modulo measurement precision).

In FIG. 3B, the command indicates movement, but the sensor does not follow: something is blocking a body attached to the joint. A rotation movement is ordered (the command 323 shows that the angle 312 increases over time 311). The observed or measured real movement 324 only indicates a stable position (the angle does not exceed a certain value). After the predefined error measurement threshold is exceeded, it can be concluded that an obstacle has enter into collision with the robot.

In FIG. 3C, both the sent command and the measures of the sensor indicate a movement, but a discrepancy progressively increases. A particular command 333 is sent (for example the command 323 shows that the angle 322 is supposed to increase and then decrease over time 321, for example during a choreography). The observed or measured real movement 324 indicates that the real movement follows the command but that the movement is not complete (e.g. increasing delay or diminishing amplitude). If the predefined error measurement threshold is exceeded, it can be concluded with sufficient confidence that an obstacle has enter into collision with the robot (or that the robot has enter collision with an object of a collision, since movements are relative) and is slowing down the expected movement. It generally can be inferred that the obstacle is movable and/or light weight and/or deformable (e.g. pillow, toy, moving animal, etc).

Further parameters can be taken into account, in order to refine and detail the collision situation. Sensors' data can establish whether the robot is moving and colliding an object or whether a moving object is colliding the static robot (or if both objects are moving). Computer vision (combined with audio analysis) can help to categorize the collision event.

Further actions, optionally depending on the categorized event, can be performed by the robot. The reaction of the robot can be different if, for example, the robot is static and hit by a balloon or by a user (face detection) or is moving and colliding with a furniture in the apartment. In practice, such collision assessments will affect the further amplitudes and velocity of movements performed in the short term by the robot.

FIG. 4 details some aspects of one embodiment of the method. In more details, the previous (e.g. past or archived) articular commands 401 are retrieved or accessed and compared with the (real) articular sensors' readings 402 (for example by Magnetic Rotary Encoders). There is then computed a joint error 411 (e.g. a measurement error threshold). Said error for example can be associated with absolute or relative position measurement errors measurement and/or with sensors' delays. A sensor delay designates the time delay between the time when a command is sent and its effect is visible to the Motion controller (through the MRE readings for example). If after sensor delay, a measured joint articular position is far from the articular command being sent, then it is likely that something outside the robot is exerting a force on a robot body attached to this joint. Such forces can also be detected faster by looking at the error measured on the first derivative (speed) of the articular command and sensor. The errors 411 are taken into account to perform comparisons between commanded and measured motions. The preceding steps are iterated for one or more joints (or articular parts), if not all parts, belonging to a same articular chain (e.g. the right arm). Data is fusioned with capacitive sensors' readings 413 (which are in limited number). If available, such readings can help to assess the collision situation (i.e. to determine if the articular group is touched or collided 420). Further sensors' data is used to refine and characterize 421 the collision situation (relative movement, strength of exerted force, speed/velocity, computer vision, communication with surrounding connected objects and/or other robots, audio ambiance, face detection, etc). Depending on collected facts and a decision rules, further actions 422 (e.g. motions, speech, animation) can be performed by the robot.

There is further disclosed a method of detecting collision of the robot with one or more obstacles on a trajectory. A trajectory can be a collection of gestures or movements executed by the members of the robot. The movements of the joints and/or articular chains are monitored in a manner which enables the detection of one or more collisions with one or more obstacles.

A motion or a movement or a gesture can be associated with parameters characterized in geometry and dynamics, e.g. amplitude and velocity of, for example, joints and/or articular chains.

In an embodiment, at a control cycle, the motion controller takes as input a joint target position and/or velocity for one or more articulations of the robot; a target may come from a choreographed animation or may be the result of a computation; optionally from such a target position, the method computes the target position and/or velocity of every considered point of the robot ("envelope"); for all points, later in time, the method measures the real or obtained position and/or velocity of one or more corresponding points. The method then deduces which part of the robot has endured a collision, if any. In an embodiment, a collision hypothesis (e.g. location of the obstacle and corresponding impacted parts of the robot) is formulated and a simulation is performed. If the comparison of the real measured values and the simulated values exceed a predefined thresholds, the hypothesis is selected, otherwise the step is iterated.

In some embodiments, optimizations for faster processing are performed: a variable number of points can be considered (for example, only articular chains can be considered, or, to the opposite, the position and dynamics of body envelope can be precisely determined). The number of points taken into account can also evolve over time.

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A computer-implemented method of determining a collision between an object and a humanoid robot, comprising:
    monitoring one or more articular parts of said robot by measuring parameters associated with real displacements of said one or more articular parts, the one or more articular parts being associated with at least one of a head, a leg, a foot, an arm, a hand, and a torso;
    comparing said measured parameters with expected parameters associated with corresponding commanded displacements; and
    determining a collision with an object, determining the collision with the object comprising:
        integrating the comparisons performed for articular parts of the robot belonging to a same articular chain, said articular chain grouping related articular parts, wherein said grouping is dynamic; and
        identifying the object that the humanoid robot collided with by computer vision;
    wherein
        comparing said measured parameters with the expected parameters associated with the corresponding commanded displacements is performed by a second independent robot or an independent camera.

2. The method of claim 1, wherein determining the collision with the object comprises excluding one or more failures associated with the one or more parts of the robot.

3. The method of claim 1, further comprising executing one or more actions.

4. The method of claim 3, wherein the one or more actions are associated with a safety mode.

5. The method of claim 1, wherein measured parameters comprise at least one of geometric position parameters and speed of displacement parameters.

6. The method of claim 1, further comprising identifying systematic discrepancies in performed comparisons.

* * * * *